United States Patent Office 3,498,989
Patented Mar. 3, 1970

3,498,989
CERTAIN 8-SUBSTITUTED-2-ALKYL-3-BENZOYL ESTERS OF ECGONINE AND DERIVATIVES THEREOF
Stephen I. Sallay, Montgomery, Pa., assignor to American Home Products Corporation, New York, N.Y., a corporation of Delaware
No Drawing. Continuation-in-part of application Ser. No. 594,391, Nov. 15, 1966. This application Apr. 16, 1969, Ser. No. 816,799
Int. Cl. A61k *27/00;* C07d *43/04, 43/14*
U.S. Cl. 260—292   9 Claims

ABSTRACT OF THE DISCLOSURE

The disclosure is directed to cocaine derivatives and more particularly to 8-substituted norecgonine benzoate esters and their acid addition salts. The compounds are useful as anticonvulsants.

---

This application is a continuation-in-part of application Ser. No. 594,391, filed Nov. 15, 1966, now abandoned by Stephen I. Sallay.

This invention relates to and has for its objects the provision of new physiologically active compounds, novel processes for their production and new intermediates useful in the preparation thereof.

More particularly, this invention relates to compounds of the Formula I:

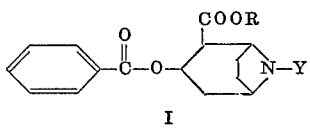

I and the pharmaceutically acceptable acid-addition salts thereof; wherein R represents an alkyl having less than 8 carbon atoms, and Y is selected from the group consisting of alkyl having from 2 to 8 carbon atoms and

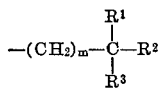

wherein $R^1$ represents hydrogen, $R^2$ is selected from the group consisting of hydrogen and hydroxy or together $R^1$ and $R^2$ is oxo (=O); $R^3$ is selected from the group consisting of hydrogen, phenyl, cycloalkyl having from 5 to 6 carbon atoms and alkoxy having less than 8 carbon atoms, and $m$ is an integer from 1 to 5, with the proviso that $R^2$ is hydroxy only when $R^3$ is phenyl or cycloalkyl and with the further proviso that $R^1$ and $R^2$ are not oxo when $R^3$ is alkoxy.

Among the suitable acid-addition salts include, inter alia, inorganic acids, such as the hydrohalide acids (e.g., hydrochloric and hydrobromic acid), sulphuric acid, nitric acid, boric acid and phosphoric acid, and organic acids such as oxalic, fumaric, tartaric, citric, acetic, succinic and maleic acid.

The novel compounds of this invention are pharmacologically active substances which are useful as anticonvulsants. Hence, the compounds may be used for such purposes in lieu of other known anticonvulsants.

The compounds may be formulated for such administration, the concentration and/or dosage being based on the activity of the particular compound and the requirements of the patient.

The compounds of this invention can be prepared by the novel process of this invention which may be represented by the following reaction scheme wherein Y' is alkyl, alkoxy alkyl, phenyl alkyl and cycloalkyl alkyl, and R is an hereinbefore defined:

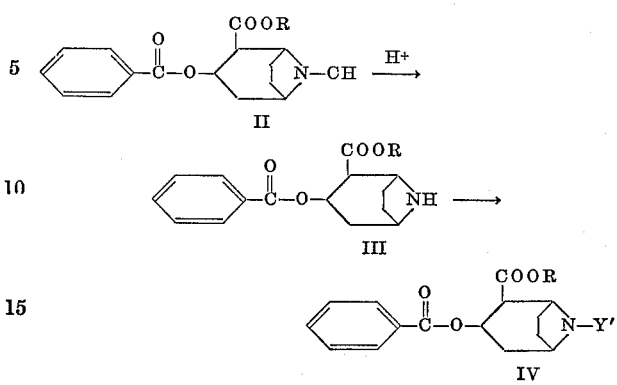

According to one feature of this invention the N-cyano compounds of Formula II are subjected to acid hydrolysis by use of an alkyl hydrogen sulfate in an excess of a lower alkanol in accordance with the procedure described in copending application Ser. No. 410,716, filed Nov. 12, 1964, in order to yield the compounds of Formula III, which are intermediates of this invention. Alternatively, these compounds (III) may be prepared according to the process described by H. L. Schmidt et al., Ann., 653, 184 (1962).

The compounds of Formula III are then N-alkylated, with a suitable alkylating agent (e.g., ethyl iodide, propyl bromide, butyl bromide), to yield the compounds of Formula IV which are final products of this invention.

The N-cyano starting compounds of this invention may be prepared in accordance with any conventional procedure such as described in the article by J. V. Braun et al., Ber. 51, pp. 235–252 (1918).

In accordance with another feature of this invention the compounds of Formula III may be reacted with a quaternary ammonium compound of the formula:

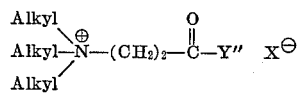

V wherein X is a halide; Y″ is phenyl or cycloalkyl having 5 to 6 carbon atoms, in an inert organic solvent, preferably in the presence of an acid acceptor, to yield compounds of the formula:

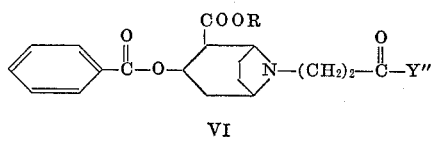

VI wherein Y″ is as hereinbefore defined, which are additional final products of this invention.

Alternatively, the compounds of Formula VI may be prepared by reacting the compounds of Formula III with a compound of the formula:

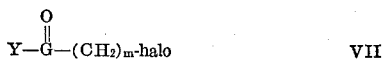

VII such as ω-halo carboxylic acid esters, β-halo-propiophenone and the like, wherein Y and $m$ are as hereinbefore defined, in an inert solvent at a temperature between 50° and 150° C., preferably in the presence of an acid acceptor.

Additionally, the compounds of Formula VI may be treated with sodium borohydride in an inert solvent so as to reduce the keto group and form the corresponding N-hydroxyalkyl compounds. Further, treatment of the N-hydroxyalkyl compounds in a conventional manner with acyl chlorides yields the acyloxy derivatives.

In the pharmacological evaluation of the biological activity of the compounds of this invention, the in vivo effects are tested as follows. In a preliminary screening a compound to be tested is administered orally or intraperitoneally to three mice (14 to 24 grams) at each of the following doses: 400, 127, 40 and 12.7 milligrams per kilogram of host body weight (m.p.k.). The animals are watched for a minimum of two hours during which time signs of general stimulation (i.e., increased spontaneous motor activity, hyperactivity on tactile stimulation, twitching), general depression (i.e., decreased spontaneous motor activity, decreased respiration), autonomic activity (i.e., miosis, mydriasis, diarrhea) are noted.

When typical compound 8-(2-benzoylethyl) norecgonine, methyl ester, benzoate was tested in the foregoing procedure, it induced mydriasis and decreased motor activity at a dose of 40 m.p.k. administered orally.

In further in vivo testing of anticonvulsant activity a compound to be tested is administered orally or intraperitoneally at a number of dose levels to groups of six mice (3 males and 3 females). One hour later if the compound was administered orally, or one-half later if the compound was administered intraperitoneally, the animals are challenged with metrazol 125 m.p.k. intraperitoneally. The incidence of clonic and tonic convulsions and deaths is observed for one-half hour. Protection against convulsions and death is determined by comparison with controls run simultaneously. An effective dose for fifty percent of the animals tested ($ED_{50}$) against convulsions and/or deaths is calculated from probit-log dose curves.

In the foregoing test 8-(2-benzoylethyl) norecgonine, methyl ester, benzoate was found to have an $ED_{50}$ at a dose of 101 to 200 m.p.k.

In further in vivo testing of anticonvulsant activity a compound to be tested is administered orally at graded dose levels to groups of six mice. One hour later, the animals are given a supramaximal electroshock through corneal electrodes (25 ma., 0.2 sec.). Presence or absence of tonic extensor seizures as well as the number of deaths are recorded.

The percent protection against seizures in terms of $ED_{50}$ is calculated with reference to the protection afforded by standard compounds. The doses to the groups of animals are given at 400, 127, 40 and 12.7 m.p.k. at the same time. If the $ED_{50}$ is 12.7, the dose is reduced in half log steps. Thus the next four doses would be 4, 1.27, 0.4 and 0.127 m.p.k.

In the foregoing test 8-(2-benzoylethyl) norecgonine, methyl ester, benzoate was found to have an $ED_{50}$ at a dose of 101 to 200 m.p.k.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, and then dehydrated sufficiently to make it suitable for pressing into a solid form. They may be administered orally in the form of solutions which may contain coloring and flavoring agents or they may be injected parenterally, that is, intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims. In the examples all temperatures are stated in degrees centigrade and the following abbreviations are used: "gm." for grams, "ml." for milliliters.

EXAMPLE 1

8-(2-benzoylethyl)norecgonine, methyl ester, benzoate

A. Preparation of N-norcocaine.—3.14 gm. of N-cyano-nor-cocaine is dissolved in 75 ml. of methanol which contains 1.96 gm. of concentrated sulfuric acid. The reaction mixture is heated in an autoclave at 135° C. for 5 hours, cooled and evaporated to dryness. The residue is dissolved in ether and extracted with water. The ether extracted acidic mother-liquor was then alkalized and extracted with ether. The ether solution yielded 1.2 gm. of N-nor-cocaine. IR spectrum possessed bands at $3.0\mu$ (NH), $3.38\mu$ (CH), $5.80\mu$ (esters). NMR spectrum showed a singlet at $\delta 3.65$ p.p.m. (—COOCH$_3$), a multiplet at $\delta 7.25$–8.1 p.p.m. (—O—COC$_6$H$_5$) and there was no chemical shift for the —N—CH$_3$ group.

B. Preparation of 8 - (2 - benzoylethyl)norecgonine, methyl ester, benzoate.—3.5 gm. of N-nor-cocaine, 4.2 gm. of β-trimethylamino-propiophenoneiodide and 1.85 gm. of Na$_2$CO$_3$ is dissolved in 40 ml. of dimethylformamide and stirred at room temperature for 5 hours. The reaction mixture is diluted with 100 ml. of water and extracted with ether. The ether extract yields 4.9 gm. of crystalline 8-(2-benzoylethyl)norecgonine, methyl ester, benzoate which upon recrystallization from benzene-ligroin had a melting point of 82.5–84°.

Analysis.—Calcd. for C$_{25}$H$_{27}$O$_5$N (percent): C, 71.24; H, 6.46; N, 3.32. Found: C, 70.98; H, 6.80; N, 2.98.

By addition of oxalic acid in ethanol to the ether extract there is obtained the oxalate salt.

EXAMPLE 2

8-(2-benzoylethyl)norecgonine, ethyl ester, benzoate

Following the procedure of Example 1B but substituting N-norecgonine ethyl ester for N-nor-cocaine there is obtained 8-(2-benzoylethyl)norecgonine, ethyl ester, benzoate.

EXAMPLE 3

8-(2-benzoylethyl)norecgonine, butyl ester, benzoate

Following the procedure of Example 1B but substituting N-norecgonine butyl ester for N-nor-cocaine there is obtained 8-(2-benzoylethyl)norecgonine, butyl ester, benzoate.

EXAMPLE 4

8-(2-benzoylethyl)norecgonine, isoheptyl ester, benzoate

Following the procedure of Example 1B but substituting N-norecgonine isoheptyl ester for N-nor-cocaine there is obtained 8-(2-benzoylethyl)norecgonine, isoheptyl ester, benzoate.

EXAMPLE 5

8-(2-benzoylethyl)norecgonine, octyl ester, benzoate

Following the procedure of Example 1B but substituting N-norecgonine octyl ester for N-nor-cocaine there is obtained 8-(2-benzoylethyl)norecgonine, octyl ester, benzoate.

EXAMPLE 6

8-(2-benzoylethyl)norecgonine, pentyl ester, benzoate

Following the procedure of Example 1B but substituting N-norecgonine pentyl ester for N-nor-cocaine there is obtained 8-(2-benzoylethyl)norecgonine, pentyl ester, benzoate.

EXAMPLE 7

8-(2-cyclohexoylethyl)norecgonine, methyl ester, benzoate

Following the procedure of Example 1B but substituting β-trimethylaminoethyl cyclohexyl ketone iodide for β-trimethylaminopropiophenone iodide there is obtained 8-(2-cyclohexoylethyl)norecgonine, methyl ester, benzoate.

EXAMPLE 8

8-(2-cyclopentoylethyl)norecgonine, methyl ester, benzoate

Following the procedure of Example 1B but substituting β-trimethylaminoethyl cyclopentyl ketone iodide for β-trimethylaminopropiophenone iodide there is obtained 8-(2-cyclopentoylethyl)norecgonine, methyl ester, benzoate.

EXAMPLE 9

8-phenethyl-norecgonine, methyl ester, benzoate, hydrochloride 0.02 mole of N-nor-cocaine, 0.01 mole of phenylethyl bromide and 0.1 gm. of sodium iodide are dissolved in 100 ml. of n-butanol and refluxed for 24 hours. The solvent is removed by evaporation in vacuo and the residue is extracted with petroleum ether to remove unreacted phenylethyl bromide. The residue is then extracted with ether and the ether extract is created with alcoholic hydrogen chloride to yield 8-phenethyl-norecgonine, methyl ester, benzoate, hydrochloride.

EXAMPLE 10

8-butyl-norecgonine, methyl ester, benzoate, hydrochloride

Following the procedure of Example 9 but substituting butyl bromide for phenylethyl bromide there is obtained 8-butyl-norecgonine, methyl ester, benzoate, hydrochloride.

EXAMPLE 11

8-octyl-norecgonine, methyl ester, benzoate, hydrochloride

Following the procedure of Example 9 but substituting octyl bromide for phenylethyl bromide there is obtained 8-octyl-norecgonine, methyl ester, benzoate, hydrochloride.

EXAMPLE 12

8-phenylbutyl-norecgonine, methyl ester, benzoate, hydrochloride

Following the procedure of Example 9 but substituting phenylbutyl bromide for phenylethyl bromide there is obtained 8-phenylbutyl-norecgonine, methyl ester, benzoate, hydrochloride.

EXAMPLE 13

8-cyclohexylethyl-norecgonine, methyl ester, benzoate, hydrochloride

Following the procedure of Example 9 but substituting cyclohexylethyl bromide for phenylethyl bromide there is obtained 8-cyclohexylethyl-norecgonine, methyl ester, benzoate, hydrochloride.

EXAMPLE 14

8-(4-methoxybutyl)norecgonine, methyl ester, benzoate, hydrochloride

Following the procedure of Example 9 but substituting methoxybutyl bromide for phenylethyl bromide there is obtained 8-(4-methoxybutyl)norecgonine, methyl ester, benzoate, hydrochloride.

EXAMPLE 15

8-(4-butoxybutyl)norecgonine, methyl ester, benzoate, hydrochloride

Following the procedure of Example 9 but substituting butoxybutyl bromide for phenylethyl bromide there is obtained 8-(4-butoxybutyl)norecgonine, methyl ester, benzoate, hydrochloride.

EXAMPLE 16

8-(3-ethoxypropyl)norecgonine, methyl ester, benzoate, hydrochloride

Following the procedure of Example 9 but substituting ethoxypropyl bromide for phenylethyl bromide there is obtained 8-(3-ethoxypropyl)norecgonine, methyl ester, benzoate, hydrochloride.

EXAMPLE 17

8-(4-methoxypentyl)norecgonine, methyl ester, benzoate hydrochloride

Following the procedure of Example 9 but substituting methoxypentyl bromide for phenylethyl bromide there is obtained 8-(4-methoxypentyl)norecgonine, methyl ester, benzoate, hydrochloride.

EXAMPLE 18

8-(3-octoxyhexyl)norecgonine, methyl ester, benzoate, hydrochloride

Following the procedure of Example 9 but substituting octoxyhexyl bromide for phenylethyl bromide there is obtained 8-(3-octoxyhexyl)norecgoine, methyl ester, benzoate, hydrochloride.

EXAMPLE 19

8-[(3-hydroxy-3-phenyl)propyl]norecgonine, methyl ester, benzoate 8-(2-benzoylethyl)norecgonine, methyl ester, benzoate is dissolved in methanol and treated with sodium borohydride at room temperature for 16 hours. The mixture is filtered and the solvent evaporated. The residue is then dissolved in ether, washed with water and dried. The ethereal solution is evaporated and the residue is recrystallized from benzene-ligroin to yield 8-[(3-hydroxy-3-phenyl)propyl]-norecgonine, methyl ester, benzoate.

What is claimed is:
1. A compound selected from the group consisting of those of the formula

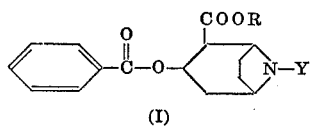

(I)

and the pharmaceutically acceptable acid-addition salts thereof, wherein R represents an alkyl having from one to eight carbon atoms, and Y is

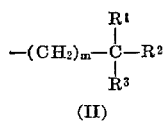

(II)

wherein $R^1$ represents hydrogen, $R^2$ is selected from the group consisting of hydrogen and hydroxy, and together $R^1$ and $R^2$ are oxo (=O), R3 is selected from the group consisting of hydrogen, phenyl, cycloalkyl having from 5 to 6 carbon atoms and alkoxy having from one to eight carbon atoms, and $m$ is an integer from 1 to 5, with the proviso that $R^2$ is hydroxy only when R3 is selected from the group consisting of phenyl and cycloalkyl and with the further proviso that $R^1$ and $R^2$ are not oxo when $R^3$ is alkoxy.

2. A compound according to claim 1 having the structural formula

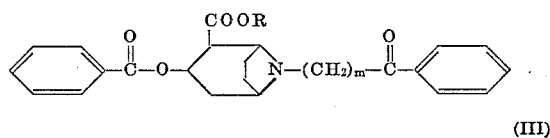

(III)

wherein R represents an alkyl group having from one to five carbons and $m$ is an integer from 1 to 5.

3. A compound according to claim 2 that is 8-(2-benzoylethyl)norecgonine, methyl ester, benzoate.

4. A compound according to claim 2 that is 8-(2-benzoylethyl)norecgonine, ethyl ester, benzoate.

5. A compound according to claim 1 that is 8-phenethylnorecgonine, methyl ester, benzoate.

6. A compound according to claim 1 that is 8-(4-methoxybutyl)norecgonine, methyl ester, benzoate.

7. A compound according to claim 1 that is 8-[(3-hydroxy-3-phenyl)propyl]-norecgonine, methyl ester, benzoate.

8. A compound according to claim 1 that is 8-(2-cyclohexoylethyl)norecgonine, methyl ester, benzoate.

9. A compound according to claim 1 that is 8-(2-cyclopentoylethyl)norecgonine, methyl ester, benzoate.

References Cited

UNITED STATES PATENTS 2,947,752  8/1960  Rudner et al. _____ 260—292

HENRY R. JILES, Primary Examiner

ALAN L. ROTMAN, Assistant Examiner